United States Patent
Kazmi (10) Patent No.: US 9,706,456 B2
(45) Date of Patent: *Jul. 11, 2017

(54) MEASUREMENT BANDWIDTH CONFIGURATION METHOD

(71) Applicant: TELEFONAKTIEBOLAGET L M ERICSSON (PUBL), Stockholm (SE)

(72) Inventor: Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,575

(22) Filed: Sep. 14, 2015

(65) Prior Publication Data

US 2016/0007251 A1    Jan. 7, 2016

Related U.S. Application Data

(63) Continuation of application No. 12/361,947, filed on Jan. 29, 2009, now Pat. No. 9,167,462.

(Continued)

(51) Int. Cl.
*H04W 36/00* (2009.01)
*H04W 24/10* (2009.01)
*H04W 48/08* (2009.01)
*H04W 28/16* (2009.01)

(Continued)

(52) U.S. Cl.
CPC ....... *H04W 36/0083* (2013.01); *H04W 24/10* (2013.01); *H04W 28/16* (2013.01);

(Continued)

(58) Field of Classification Search
CPC .................................................. H04W 36/0083
See application file for complete search history.

(56) References Cited

U.S. PATENT DOCUMENTS

2004/0102158 A1* 5/2004 Schwarz ............... H04W 36/30
455/67.11
2005/0020273 A1   1/2005 Fong et al.
(Continued)

FOREIGN PATENT DOCUMENTS

WO    2006031465 A2   3/2006
WO    2007036039 A1   4/2007
WO    2008/097185 A2   8/2008

OTHER PUBLICATIONS

NEC: "UE Measurement Bandwidth for Intra Frequency Measurements," 3GPP TSG-RAN WG2#60; R2-074973, Korea, Jeju; Nov. 5-9, 2007.

(Continued)

*Primary Examiner* — Justin Lee (57) ABSTRACT

In a cellular radio system measurement bandwidth for a plurality of base stations belonging to a cellular radio system is performed by configuring the base stations to signal the measurement bandwidth to user equipments connected to the cellular radio system for performing downlink neighbor cell measurements over the signaled measurement bandwidth in the user equipment by first receiving a set of information. The received information is used for configuring the measurement bandwidth using the received set of information and the configured measurement bandwidth is signaled to the base stations.

6 Claims, 6 Drawing Sheets

Related U.S. Application Data (60) Provisional application No. 61/024,684, filed on Jan. 30, 2008.

(51) Int. Cl.
    *H04W 8/24*     (2009.01)
    *H04W 88/02*     (2009.01)
    *H04W 88/08*     (2009.01)
    *H04W 92/20*     (2009.01)

(52) U.S. Cl.
    CPC .............. *H04W 48/08* (2013.01); *H04W 8/24* (2013.01); *H04W 88/02* (2013.01); *H04W 88/08* (2013.01); *H04W 92/20* (2013.01)

(56) References Cited

U.S. PATENT DOCUMENTS

| | | |
|---|---|---|
| 2008/0242302 A1 | 10/2008 | Pulkkinen et al. |
| 2009/0010219 A1 | 1/2009 | Lee et al. |
| 2009/0042532 A1 | 2/2009 | Bienas et al. |
| 2009/0191863 A1 | 7/2009 | Kazmi |
| 2010/0285802 A1* | 11/2010 | Ahluwalia ........ H04W 36/0083 455/436 |

OTHER PUBLICATIONS

Ericsson: "Bandwidth of Mobility Related Measurements in E-UTRAN," 3GPP TSG-RAN WG4 (Radio) Meeting #42, R4-070192, St. Louis, MO, US, Feb. 12-16, 2009.

3GPP TSG-WG1 Meeting #48, Tdoc R1-071250; St. Louis, MO, US: "LS on LTE measurements supporting mobility," Feb. 12-16, 2007.

3GPP: 3GPP TS 36.214: Evolved Universal Terrestrial Radio Access (E-UTRA); Physical Layer; Measurements, 20071101, vol. 36.214. No. 8.1.0, Nov. 1, 2007; http:www.3gpp.org/FTP/Specs/html-inf.

3GPP. 3rd Generation Partnership Project; Technical Specification Group Radio Access Network; Evolved Universal Terrestrial Radio Access (E-UTRA); Base Station (BS) Radio Transmission and Reception; (Release 8), 3GPP TS 36.104 v1.0.0 (Nov. 2007).

3GPP. 3rd Generation Partnership Project; Technical Specification Group Radio Access Network; Evolved Universal Terrestrial Radio Access (E-UTRA); Physical Layer; Measurements (Release 8), 3GPP TS 36.214 v8.0.0 (Sep. 2007).

Nokia: "RSSI measurement bandwidth," 3GPP TSG-RAN4 #44 Meeting. R4-071329; Athens, Greece; Aug. 20-24, 2007.

Motorola: "E-UTRA Measurements Related to Mobility," 3GPP TSG RAN WG1 Meeting #47bis, R1-070044; Sorrento, Italy; Jan. 19, 2007.

3GPP TR 25.814 v7.1.0 (Sep. 2006); 3rd Generation Partnership Project; Technical Specification Group Radio Access Network; Physical layer aspescts for evolved Universal Terrestrial Radio Access (UTRA) (Release 7).

Motorola: "E-UTRA Physical Layer Measurements;" 3GPP TSG RAN WG1 Meeting #47; R1-063077; Riga, Latvia; Nov. 6-10, 2006.

Ericsson: "Idle Gaps for Handover Measurements in E-UTRAN;" 3GPP TSG-RAN WG2 Meeting #56; Riga, Latvia; Nov. 6-10, 2006.

\* cited by examiner

MEASUREMENT BANDWIDTH CONFIGURATION METHOD

This application is a continuation of U.S. patent application Ser. No. 12/361,947 filed Jan. 29, 2009, which claims the benefit of U.S. patent application No. 61/024,684 filed on Jan. 30, 2008, the disclosures of which are fully incorporated herein by reference.

TECHNICAL FIELD

The present invention relates to a method for configuring measurement bandwidth in a cellular radio system.

BACKGROUND

In evolved UMTS Terrestrial Radio Access Network (E-UTRAN) system several cell transmission bandwidths are possible e.g. 1.4 MHz, 3 MHz, 5 MHz, 10 MHz, 15 MHz, 20 MHz etc, see 3GPP TS 36.104, "Evolved Universal Terrestrial Radio Access (E-UTRA); Base Station (BS) radio transmission and reception". Also, different transmission bandwidth can be used in neighboring cells on the same carrier frequency. As a result cells with the same center frequency, sometimes termed intra-frequency cells, may have different transmission bandwidths. Irrespective of the cell transmission bandwidth, a user equipment (UE) is usually required to perform measurements on the neighboring cells. It is important that the measurement reports from different cells are consistent and can be used by the network to execute reliable handovers, i.e. correct handover decisions.

Furthermore, mobility support is one of the fundamental features or any cellular systems. In E-UTRAN the mobility is to be supported both in idle mode and in connected mode. In idle mode the UE in E-UTRAN is required to perform autonomous cell reselection based on some network signaled parameters. This allows the network to control UE mobility behavior in the coverage area to some extent. Also the UE shall be able to perform cell reselection within the same frequency layer (intra frequency cell reselection), between different frequency layers (inter-frequency cell reselection) and also between E-UTRAN and other systems such as UTRAN (inter-RAT cell reselection).

In connected mode the network shall direct the UE to perform handover to a particular cell, which may belong to the same serving frequency (intra-frequency handover) or to another frequency (inter-frequency handover). Though this decision is taken by the network, it's primarily based on the UE measurement reports. As in case of cell reselection, the UE in connected mode shall also support mobility (i.e. handovers) within the same frequency layer, inter-frequency handovers and inter-RAT handovers.

The cell reselection and handovers are generally based on one or more downlink measurements. These measurements are done on some known reference symbols or pilot sequences.

Another important aspect of the mobility is the identification of the UE position or geographical location. This allows the UE to get an access to location based services, e.g. map reading. There are several different types of positioning methods. In some of the methods the UE identifies its location based on one or more neighbor cell measurements that are also done on some known reference symbols or pilot sequences.

Neighbor cell measurements are performed by the UE on downlink channels in the serving as well as on neighbor cells for example on reference symbols or pilot sequences. Unlike other measurements such as Channel quality indicator (CQI) which is done on Transmission Time interval (TTI) level (e.g. 1 ms), the neighbor cell measurements are performed over longer time duration, typically in the order of few 100 ms. Neighbor cell measurements can be broadly divided into two main categories:
Radio related measurements
Timing related measurements The radio related measurements are used to take handover decisions and allow a UE to do cell reselection in idle mode. Depending upon a particular mobility scenario more than one downlink measurement may be required to ensure robust mobility decisions. For instance coverage, interference and load in the cell would impact the cell change/handover decision.

In E-UTRAN the major mobility measurements are done on reference symbols, which are sent with a certain pattern defined in time and frequency. Furthermore the pattern is repeated in every slot (i.e. 0.5 ms). The agreed downlink channel measurements are described in 3GPP TS 36.214, "Evolved Universal Terrestrial Radio Access (E-UTRA); Physical layer; Measurements":
Reference symbol received power (RSRP)
E-UTRA Carrier received signal strength indicator (E-UTRA Carrier RSSI)
Reference symbol received quality (RSRQ); RSRQ=RSRP/RSSI.

RSRP is measured over the downlink reference symbol whereas carrier RSSI is measured over all the sub-carriers (i.e. sub-carriers containing reference symbols and data).

In E-UTRA, as stated above, the neighbor cells, even operating on the same carrier frequency (i.e. intra-frequency cells), may employ different transmission bandwidth. Nevertheless the downlink measurements from all the cells operating over the same carrier frequency in at least part of the coverage area should be performed over the same measurement bandwidth to ensure consistent measurement reports. It is known that measurement bandwidth can be signaled by the serving cell to the UE.

In order to prevent ping pang during cell change, one important characteristics of the neighbor cell measurement is to properly filter out the affect of fading. The averaging in time domain and in frequency domain can be traded. However, longer time domain filtering may cause unnecessary delay in obtaining measurement reports and this could adversely affect the mobility performance.

In connected or active mode the inter-frequency RSRP, RSRQ and RSSI are performed by the UE during idle gaps, which are repeated periodically. Similarly E-UTRA measurements (e.g. E-UTRA FDD measurement) done by a multimode terminal when operating under another technology (e.g. WCDMA, E-UTRA TDD etc) are to be performed during gaps. A WCDMA UE will perform E-UTRA measurements during compressed mode gaps.

A UE has a relatively short time to perform IF and IRAT measurements. The actual time depends upon configured gaps. For instance denser gaps (i.e. more frequent gaps) would lead to shorter overall measurement period as the UE can obtain sufficient samples in relatively shorter time. Therefore it may be sufficient to measure over shorter measurement bandwidth e.g. over 5 MHz rather than 10 MHz bandwidth. However dense pattern may not be in use all the time because it adversely affects user throughput.

Therefore when infrequent gaps are used the measurement bandwidth needs to be adjusted, i.e. larger measurement bandwidth may be desirable. By increasing the measurement bandwidth the measurement period can be reduced thereby retaining good mobility performance.

There are three main deployment scenarios:
Homogeneous bandwidth deployment: all cells have same bandwidth
Heterogeneous bandwidth deployment: cells have different bandwidth
Cells on borders of homogeneous and heterogeneous bandwidth cells The above mentioned deployment scenarios are not expected to change very frequently.

However, there are several events, which require more frequent modification of the measurement bandwidth more such as:
Change in measurement gap pattern (e.g. periodicity changed from 20 ms to 140 ms or vice versa).
A new base station is added or removed.
Change in cell planning: when cell transmission bandwidth of one or more of the cells is upgraded or downgraded.

It is important that network is able to use a consistent and optimal value of measurement bandwidth even if there following changes occur: modifications or changes in network configuration, changes in radio resource management strategies etc.

Hence, there exists a need for a cellular radio system that enables a more frequent modification of measurement bandwidth.

SUMMARY

It is an object of the present invention to provide an improved cellular radio system.

It is another object of the present invention to provide a method, system and a device that is capable of ensuring consistent measurement bandwidths in all cells.

It is yet another object of the present invention to provide a cellular radio system that enables a more frequent modification of measurement bandwidth.

These objects and others are obtained by the method, radio system node and radio system as set out in the appended claims. Thus, in a cellular radio system measurement bandwidth for a plurality of base stations belonging to a cellular radio system is performed by configuring the base stations to signal the measurement bandwidth to user equipments connected to the cellular radio system for performing downlink neighbor cell measurements over the signaled measurement bandwidth in the user equipment by first receiving a set of information. The received information is then used for configuring the measurement bandwidth using the received set of information and the configured measurement bandwidth is signaled to the base stations.

The invention also extends to a node in a cellular radio system and a cellular radio system configured to execute the method.

Using the system, node and method in accordance with the invention will allow for configuration of measurement bandwidths in various combination of environment and scenarios, e.g. in heterogeneous cell transmission bandwidth deployment scenario. Also, the measurement bandwidth can be conveniently modified whenever there is changed in cell planning, network upgrade etc. Further it is ensured that consistent measurement bandwidth parameters are used in all cells in a given coverage area; which in turn leads to consistent measurement performance which ensures robust mobility performance.

BRIEF DESCRIPTION OF THE DRAWINGS

The present invention will now be described in more detail by way of non-limiting examples and with reference to the accompanying drawings, in which.

DETAILED DESCRIPTION

Figure 1:
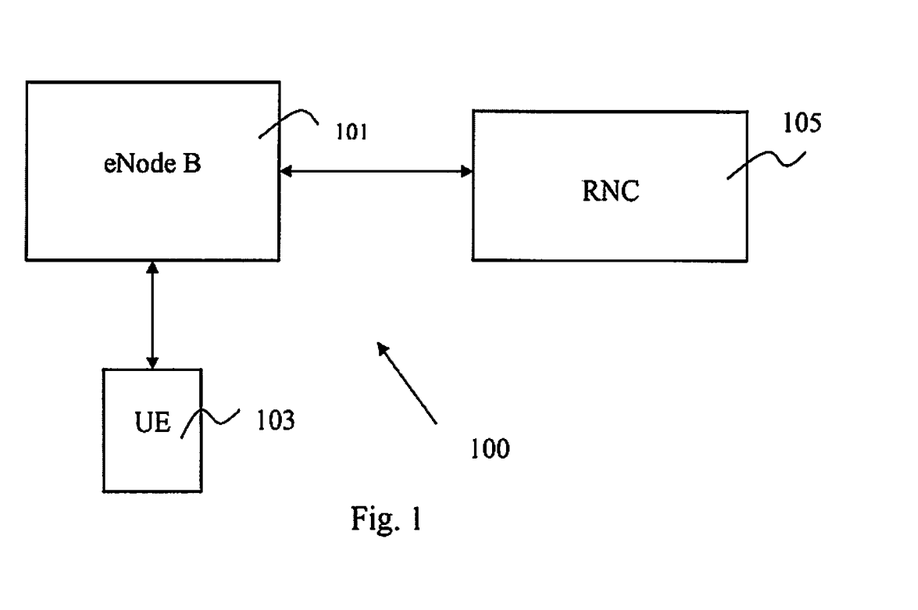
FIG. 1 is a general view of a cellular radio system.

In FIG. 1, a general view of a cellular radio system 100 is depicted. The system 100 comprises a base station (Node B) 101. The base station 101 serves a number of mobile terminals, usually termed User Equipment (UE) 103, located within the area covered by the base station 101. The base station 101 and a number of adjacent base stations (not shown) are further connected to a radio network controller node (RNC) 105.

In order to ensure that UE reports consistent measurement results from different cells operating on the same carrier frequency, the UE can be configured to perform measurements over the same measurement bandwidth in all cells in at least given portion of a coverage area.

In accordance with one embodiment, the measurement bandwidth is set to correspond to the smallest bandwidth used in all cells in a coverage area or on a particular carrier frequency. The shortest cell bandwidth gives the upper bound of the measurement bandwidth. However some additional factors may also be taken into consideration when setting the measurement bandwidth. Such factors comprise one or more of the following: propagation environment, cell planning, addition/deletion of base station with bandwidth different than existing ones, modification in radio resource management (RRM) operations etc. This is also described in more detail below.

Furthermore the border region between two coverage areas comprising cells with unequal cell bandwidth may require further modification in measurement bandwidth, which eventually can be configured at the base stations located in that area.

Additionally all cells may be operating over the same and larger bandwidth e.g. all cells' bandwidth is 20 MHz wide. Measurement over full or very large bandwidth reduces measurement errors but it also increases complexity in the UE. Therefore it may not be necessary to perform measurement over the full or very large bandwidth.

Also there is trade off between the measurement bandwidth and measurement period (i.e. time domain filtering). Therefore measurement bandwidth can be adjusted in accordance with the tolerable or affordable measurement reporting delay in a given environment.

Table 1 provides a list of some of the major factors that could be considered by the network node that sets the measurement bandwidth.

TABLE 1

List of factors affecting measurement bandwidth

| No. | Factor | Description/Comments |
|---|---|---|
| 1 | Min bandwidth of all cells/coverage area | |
| 2 | Addition/deletion of base station | |
| 3 | Propagation environment | E.g. Larger bandwidth in low Doppler and low delay spread. |
| 4 | Addition of new carrier frequency layer | Intra-frequency and IF measurements may be done over different BW; IF measurement over larger BW is less complex |
| 5 | Change in cell planning on existing carrier frequency | Bandwidth of one or more cells is upgraded or downgraded |
| 6 | Modification in RRM strategies | E.g. Measurement gap patters are significantly modified. |

Below some examples are given to illustrate how the measurement bandwidth can be estimated. The examples also illustrate the fact that measurement bandwidth configuration is not always straight forward.

Figure 2:
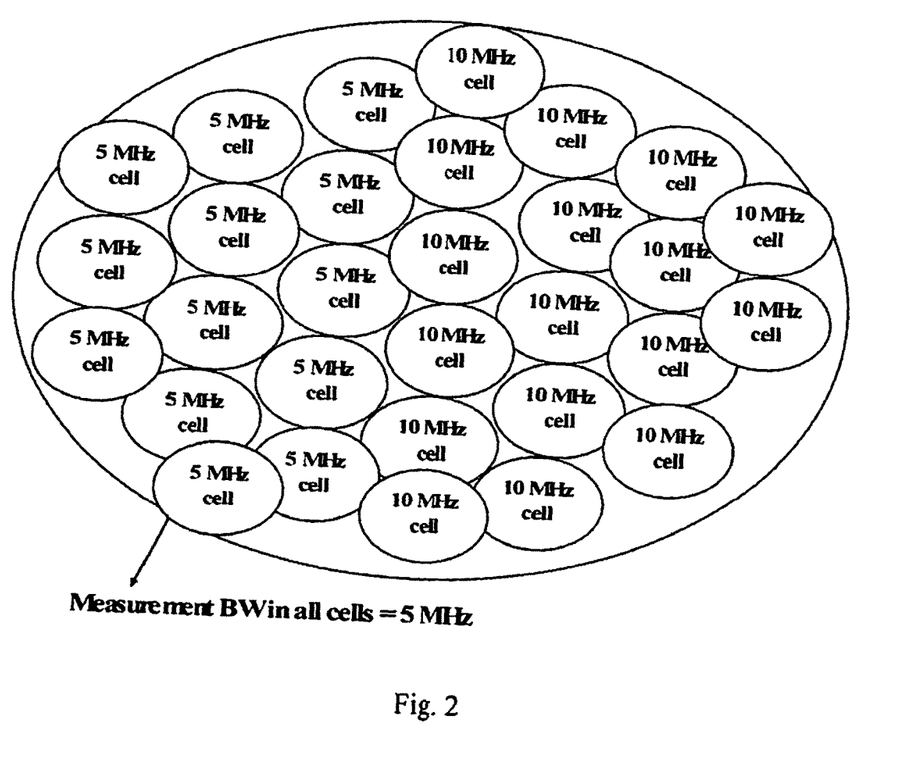
FIG. 2 is a view of a radio system in accordance with a first exemplary embodiment.

In FIG. 2 an example in which two different cell transmission bandwidths (5 MHz and 10 MHz) are used on the same carrier is depicted. In the example shown in FIG. 2 intra-frequency cells' bandwidth is either 5 MHz or 10 MHz. Further consider that 5 MHz and 10 MHz cells are contiguous as shown in FIG. 2. In this example measurement bandwidth is 5 MHz, which is the smallest bandwidth of all cells use in the entire coverage area. However, since several contiguous cells in this example operate at 10 MHz therefore in some scenario it may not be optimal to set 5 MHz measurement bandwidth in all cells in the coverage area.

Figure 3:
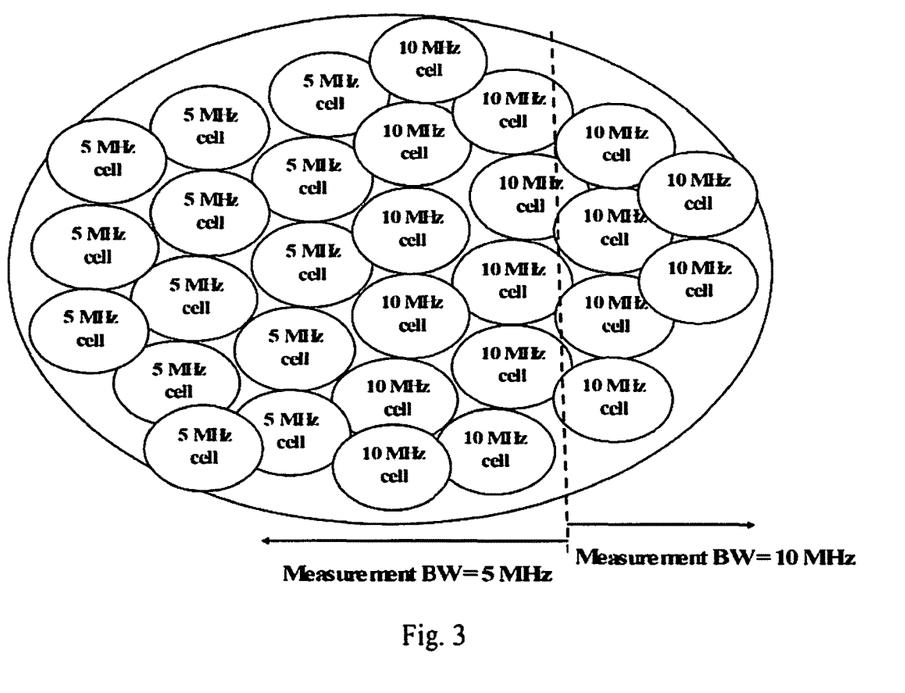
FIG. 3 is a view of a radio system in accordance with a second exemplary embodiment.

In FIG. 3 another exemplary embodiment illustrating another strategy of setting measurement bandwidth is shown. FIG. 3 shows that 5 MHz measurement bandwidth is used in large part of the coverage area comprising of all 5 MHz as well as some of 10 MHz cells (closer to the cells operating at 5 MHz). This means that in cells located on the left of the dotted line, 5 MHz measurement bandwidth is signaled to all UE, which will perform measurement using this signaled bandwidth over N best neighbors. However in all 10 MHz cells that are located on the right of the dotted line, which are indeed far away from 5 MHz cells, the measurement bandwidth is 10 MHz. This means from measurement and mobility performance point of view that at least some of the 10 MHz cells would have an edge over 5 MHz cells. As described below, additional system parameters and factors can play important role in setting the measurement bandwidth.

Furthermore, the arrangement described in conjunction with FIG. 3 will not cause any measurement inconsistency since UE will measure over the same 10 MHz in the nearest neighbors, which are typically 5-6 cells.

In accordance with another exemplary embodiment additional system parameters are also considered. This is shown in table 2 below. The estimated or configured measurement bandwidth on a particular carrier frequency is 10 MHz as listed at the end of table 2. This is because at low Doppler speeds larger measurement bandwidth can be more beneficial. Similarly due to longer gap periodicity (i.e. occurrence of gaps for performing downlink inter-frequency measurements) it is advantageous to measure over as larger bandwidth as possible as this will reduce the measurement period. The smallest cell bandwidth in the coverage area will put an upper bound on the measurement bandwidth. Therefore 10 MHz measurement bandwidth is chosen in this example.

TABLE 2

Measurement bandwidth configuration: Example 3

| No. | Parameter | | Value |
|---|---|---|---|
| 1 | Max cell bandwidth in coverage area | | 20 MHz |
| 2 | Min cell bandwidth in coverage area | | 10 MHz |
| 3 | Radio conditions | | low Doppler, low dispersion |
| 4 | Inter-frequency gap pattern: | Gap length Gap periodicity | 6 ms 120 ms |
| 5 | Configured measurement bandwidth | | 10 MHz |

In accordance with another exemplary embodiment illustrated in table 3 it is shown that it may be sufficient to have 5 MHz of measurement bandwidth. One reason is that in this example measurement gaps are more frequent (i.e. every 40 ms), which allows more possibility of performing time domain filtering in relatively shorter time interval compared to the previous example, i.e. example 2. Secondly in an environment characterized by high Doppler speed, very large measurement bandwidth (e.g. 10 MHz) may not lead to any significant performance improvement. Due to these reasons relatively shorter measurement bandwidth is used as compared to the previous example.

Overall it is noticed from these examples that measurement bandwidth is influenced by large combination of parameters and network configuration aspects.

TABLE 3

Measurement bandwidth configuration: Example 4

| No. | Parameter | | Value |
|---|---|---|---|
| 1 | Max bandwidth in coverage area | | 20 MHz |
| 2 | Min bandwidth in coverage area | | 10 MHz |
| 3 | Radio conditions | | high Doppler, high dispersion |
| 4 | Inter-frequency gap pattern: | Gap length Gap periodicity | 6 ms 40 ms |
| 5 | Configured measurement bandwidth | | 5 MHz |

The following methods can for example be used for measurement bandwidth configurations:
  Centralized method via centralized node
  Distributed method via inter-Node B communication
Centralized Method:

In accordance with one embodiment a centralized or a common node is used. The centralized node configures one or more measurement bandwidth parameters for all the cells in a coverage area. The centralized node can either be one of the base stations, a designated base station 101 or a separate dedicated node such as the Radio Network Controller 105, or done by an existing operational and maintenance (O&M). The term operational sub-system (OSS) may be interchangeably used for O&M and they have similar function and connotation. In accordance with one embodiment, the existing O&M node can be used this purpose. This is because O&M performs various other configuration operations.

Figure 4:
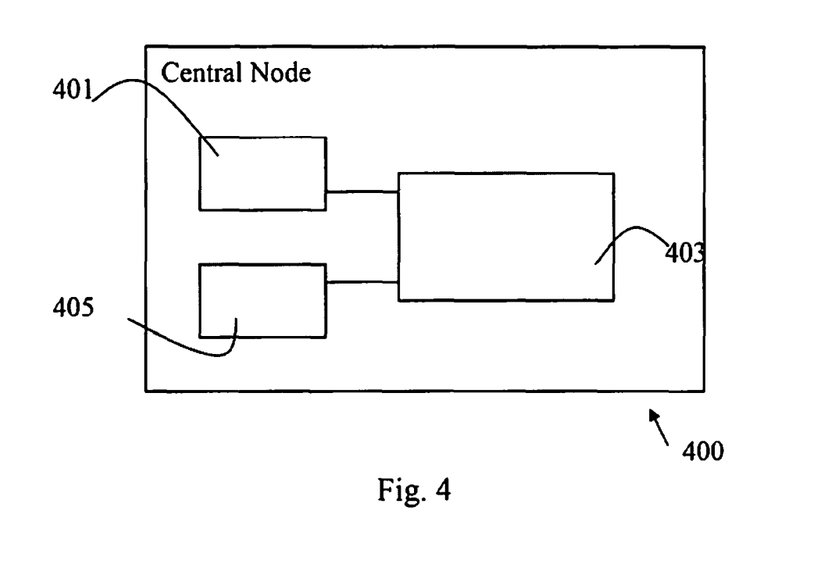
FIG. 4 is a view of a centralized node in accordance with the present invention.

In FIG. 4 a view of a centralized node 400 is shown. The exemplary centralized node 400 comprises a receiving unit 401 for receiving all the necessary information relevant for appropriate setting measurement bandwidth of downlink measurement quantities. The node 400 further comprises a calculation module 403 connected to the receiving unit 401 for generating measurement bandwidths in response to the received information. Also the node 400 comprises a signaling device 405 connected to the calculation module 403 for signaling the measurement bandwidth parameter(s) to all the base stations 101 operating in a given coverage area or under a given carrier frequency.

In order to be able to configure measurement bandwidth(s), the centralized node is configured to receive various types of input e.g. cell transmission bandwidth, gap patterns, number of carrier frequencies etc., which are used in different cells within its jurisdiction. Part of the received input may be of static or semi-static nature such as cell bandwidth.

However, when a re-configuration of the cellular radio system is made, such as when a new base station or a carrier frequency is added, removed, downgraded or upgraded, the corresponding information (e.g. cell bandwidth etc) should preferably be readily provided to the centralized node. By providing information relating to a new configuration of the system reconfiguration of measurement bandwidth(s) in response to any relevant changes in the network is enabled and consequently it is possible to make sure that downlink measurements are performed over an appropriate bandwidth. Also, other radio resource management related information such as gap patterns etc may be considered as semi dynamic or dynamic parameters.

Information such as propagation environment of the coverage area is fairly static and maybe already available at the centralized node. However, even radio environment can change in some circumstances; for instance when new base stations (normal or home base stations) are deployed in indoor environment, which was previously solely served by outdoor base stations.

The required information can be provided to the centralized node via existing interfaces i.e. via interface between O&M and eNode B (or base stations) or via X2 interface (eNode B-to-eNode B interface) depending upon which type of centralized node is used for performing configuration. Another possibility is to use provide part of the information manually via some propriety interface or connection.

In any case based on the received information the centralized node will generate measurement bandwidth parameter(s). Measurement bandwidth can be different for different carrier frequencies. Similarly network may not employ the same Radio Resource Management (RRM) strategies on different carries. In addition the network may decide to use different measurement bandwidths for different types of measurement quantities even on the same carrier frequency. As a result a centralized node may generate more than one measurement bandwidth parameter. It will then configure or signal the measurement bandwidth parameters to each of the base station in the coverage area. The signaled measurement bandwidth parameters are in a preferred embodiment associated with the corresponding carrier frequencies and/or if necessary with the corresponding measurement quantities.

Figure 5:
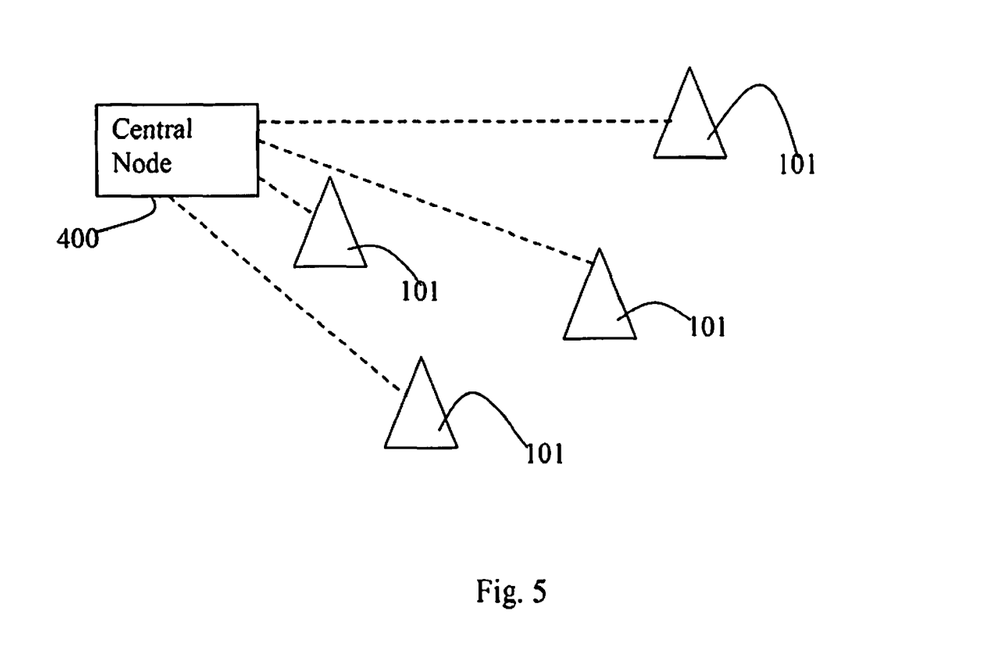
FIG. 5 is a view of a system configuration in accordance with one embodiment of the invention.

FIG. 5 illustrates a separate dedicated central node 400 configured to receive information from all base stations such as eNodeBs and also configured to provide the configured measurement bandwidths to all base stations.

Figure 6:
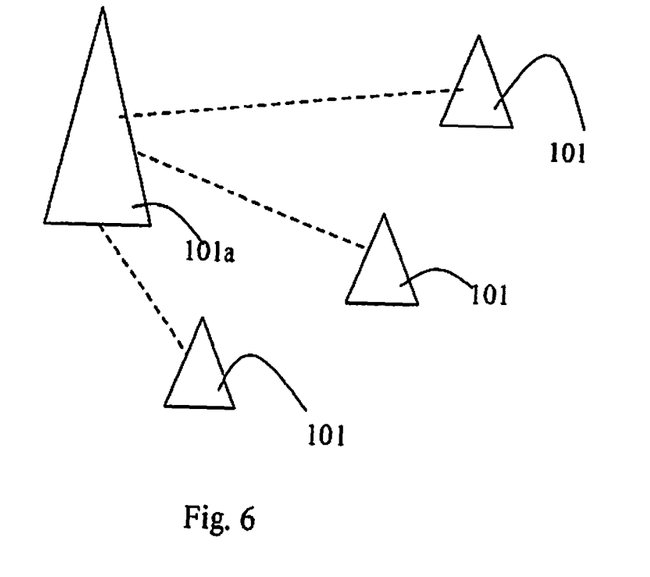
FIG. 6 is a view of a system configuration in accordance with another embodiment of the invention.

FIG. 6 is a view of a system configuration where a centralized node is used for measurement bandwidth configuration. In the system configuration shown in FIG. 6 one of the existing radio base stations here denoted 101a is configured to act as the centralized node 400.

In accordance with another embodiment of the present invention each base station receives the necessary information needed for measurement bandwidth configuration. The information contents can for example be the same the same as described above. Each base station can be configured to receive the information from all or sub-set of base stations in a particular coverage area. Furthermore, the method for setting the measurement bandwidth can also preconfigured at each base station.

In accordance with one embodiment the measurement bandwidth is set to ensure that within a given coverage area all Base stations use the same measurement bandwidth for a given carrier frequency. When any input that could influence the measurement bandwidth is changed the corresponding base station can be configured to re-evaluate the new measurement bandwidth parameter(s). Similar re-evaluation is then also likely to take place at other base station.

After re-evaluation one possibility is that each base station starts using the new measurement bandwidth parameter(s) without informing other base station. The underlying assumption in such a scenario is that that all base stations will re-evaluate similar parameter values. In accordance with another embodiment the base station where measurement bandwidth is reconfigured communicates this to all or sub-set of base stations in the coverage area. A base station can then be configured to start using the new measurement bandwidth(s) only after receiving confirmation that consistent measurement bandwidth is used in all other base stations.

Compared to a centralized method, a distributed method can result in more signaling exchange between the eNode B. However, one advantage is that no separate or dedicated node is needed for measurement bandwidth configuration.

Figure 7:
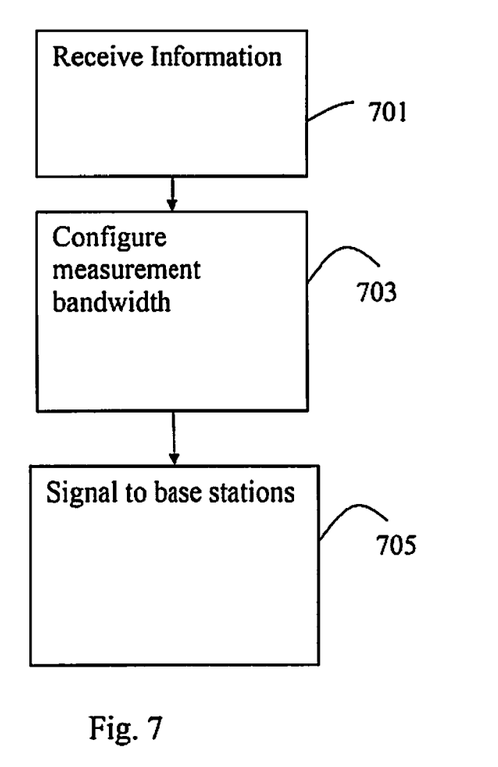
FIG. 7 is a flowchart illustrating procedural steps performed when configuring measurement bandwidth for a plurality of base stations.

In FIG. 7 a flowchart illustrating steps performed in accordance with the bandwidth configuration procedure described above. First, in a step 701, a set of information related to bandwidth measurement is received. Next, in a step 703, measurement bandwidth is calculated and configured for the base stations. Thereupon in a step 705 the bandwidths calculated and configured in step 703 are signaled to the base stations.

Using the node and method in accordance with the invention will allow for configuration of measurement bandwidths in various combination of environment and scenarios, e.g. in heterogeneous cell transmission bandwidth deployment scenario. Also, the measurement bandwidth can be conveniently modified whenever there is changed in cell planning, network upgrade etc. Further it is ensured that consistent measurement bandwidth parameters are used in all cells in a given coverage area; which in turn leads to consistent measurement performance which ensures robust mobility performance.

The invention claimed is:

1. A method of configuring measurement bandwidth performed by a base station belonging to a cellular radio system, wherein the base station is configured to signal the measurement bandwidth to user equipments in the cellular radio system for performing downlink neighbor cell measurements by the user equipments over the signaled measurement bandwidth, the method comprising the steps of:
    receiving cell transmission bandwidth information of a serving cell and neighboring cells;
    configuring the measurement bandwidth on a carrier frequency for use within the cell served by the base station, based on the received information; and signaling the configured measurement bandwidth to the user equipments operating in the cell served by the base station;

wherein at least one neighboring cell transmits on multiple carrier frequencies, and the user equipments measure different types of measurement quantities on at least one of the multiple carrier frequencies, and the method further comprises:

configuring a measurement bandwidth for each of the multiple carrier frequencies of the at least one neighboring cell;

configuring a different measurement bandwidth for each type of measurement quantity on the at least one carrier frequency; and signaling to the user equipments operating in the serving cell, the configured measurement bandwidths for each of the multiple carrier frequencies of the at least one neighboring cell and for each of the different types of measurement quantities measured on the at least one carrier frequency.

2. The method according to claim 1, wherein the base station is connected to neighboring base stations via an X2 interface in an Evolved Universal Terrestrial Access Network (E-UTRAN) system and the method includes receiving from the neighboring base stations, the cell transmission bandwidth information of the neighboring cells via the X2 interface.

3. The method according to claim 2, further comprising the base station signaling the configured measurement bandwidth to the neighboring base stations via the X2 interface in the E-UTRAN system.

4. A base station in a cellular radio system for configuring a measurement bandwidth, wherein the base station is configured to signal the measurement bandwidth to user equipments in the cellular radio system for performing downlink neighbor cell measurements by the user equipments over the signaled measurement bandwidth, the base station comprising:

a receiving unit configured to receive cell transmission bandwidth information of a serving cell and neighboring cells;

a calculation module connected to the receiving unit and configured to configure the measurement bandwidth on a carrier frequency for use within the cell served by the base station, based on the received information; and a signaling device connected to the calculation module and configured to signal the configured measurement bandwidth to the user equipments operating in the cell served by the base station;

wherein at least one neighboring cell transmits on multiple carrier frequencies, and the user equipments measure different types of measurement quantities on at least one of the multiple carrier frequencies, and wherein:

the calculation module is configured to configure a measurement bandwidth for each of the multiple carrier frequencies of the at least one neighboring cell;

the calculation module is configured to configure a different measurement bandwidth for each type of measurement quantity on the at least one carrier frequency; and the signaling device is configured to signal to the user equipments operating in the serving cell, the configured measurement bandwidths for each of the multiple carrier frequencies of the at least one neighboring cell and for each of the different types of measurement quantities measured on the at least one carrier frequency.

5. The base station according to claim 4, wherein the base station is connected to neighboring base stations via an X2 interface in an Evolved Universal Terrestrial Access Network (E-UTRAN) system and the receiving unit is configured to receive from the neighboring base stations, the cell transmission bandwidth information of the neighboring cells via the X2 interface.

6. The base station according to claim 5, wherein the signaling device is configured to signal the configured measurement bandwidth to the neighboring base stations via the X2 interface in the E-UTRAN system.

* * * * *

UNITED STATES PATENT AND TRADEMARK OFFICE
CERTIFICATE OF CORRECTION

PATENT NO. : 9,706,456 B2  Page 1 of 1
APPLICATION NO. : 14/853575
DATED : July 11, 2017
INVENTOR(S) : Kazmi It is certified that error appears in the above-identified patent and that said Letters Patent is hereby corrected as shown below:

In the Specification

In Column 1, Line 5, delete "2009," and insert -- 2009, now Pat. No. 9,167,462, --, therefor.

In Column 1, Line 34, delete "or any" and insert -- of any --, therefor.

In Column 1, Line 39, delete "Also" and insert -- Also, --, therefor.

In Column 2, Line 24, delete "symbol" and insert -- signal --, therefor.

In Column 2, Line 27, delete "symbol" and insert -- signal --, therefor.

In Column 2, Line 41, delete "pang" and insert -- pong --, therefor.

In Column 5, Line 23, delete "In FIG. 2" and insert -- In FIG. 2, --, therefor.

In Column 5, Line 34, delete "In FIG. 3" and insert -- In FIG. 3, --, therefor.

In Column 6, Line 60, delete "operational" and insert -- operations --, therefor.

In Column 6, Line 66, delete "In FIG. 4" and insert -- In FIG. 4, --, therefor.

In Column 8, Line 35, delete "In FIG. 7" and insert -- In FIG. 7, --, therefor.

In the Claims

In Column 9, Line 23, in Claim 2, delete "Access" and insert -- Radio Access --, therefor.

In Column 10, Line 31, in Claim 5, delete "Access" and insert -- Radio Access --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*